(12) United States Patent
Lin (10) Patent No.: US 8,456,724 B2
(45) Date of Patent: Jun. 4, 2013

(54) BIAXIAL SCANNING MIRROR FOR IMAGE FORMING APPARATUS

(75) Inventor: Hung-Yi Lin, Taoyuan (TW)

(73) Assignee: Touch Micro-System Technology Corp., Yangmei Township (TW)

( * ) Notice: Subject to any disclaimer, the term of this patent is extended or adjusted under 35 U.S.C. 154(b) by 329 days.

(21) Appl. No.: 12/817,338

(22) Filed: Jun. 17, 2010

(65) Prior Publication Data

US 2011/0310452 A1  Dec. 22, 2011

(51) Int. Cl.
  *G02B 26/12*  (2006.01)
(52) U.S. Cl.
  USPC ................................ 359/199.3; 359/199.1
(58) Field of Classification Search
  None
  See application file for complete search history.

(56) References Cited

U.S. PATENT DOCUMENTS

| | | | |
|---|---|---|---|
| 6,989,921 B2* | 1/2006 | Bernstein et al. | 359/290 |
| 7,355,317 B2* | 4/2008 | Greywall | 310/309 |
| 2008/0062161 A1* | 3/2008 | Brown et al. | 345/207 |
| 2008/0123167 A1* | 5/2008 | Weiss et al. | 359/198 |
| 2009/0213445 A1* | 8/2009 | Kabeya | 359/198.1 |
| 2010/0020379 A1* | 1/2010 | Lubianiker | 359/224.1 |

OTHER PUBLICATIONS

Cho, H., Yan J., Kowel S., Beyette F., Ahn C. A Scanning silicon micromirror using a bi-directionally movable magnetic microactuator. Proc. of SPIE vol. 4178 (2000) p. 106-115.*

* cited by examiner

*Primary Examiner* — Stephone Allen
*Assistant Examiner* — Jyotsna Dabbi
(74) *Attorney, Agent, or Firm* — Chen Yoshimura LLP (57) ABSTRACT

A biaxial scanning mirror for an image forming apparatus includes a first wafer, a second wafer, and a spacer. The first wafer includes a mirror unit, a rectangular rotating unit, a permanent magnet, and a magnetically permeable layer. The second wafer has at least two cores each surrounded by a planar coil applied with an AC current for switching magnetic polarization of the cores such that the cores are attracted to or repelled from the rotating unit alternatively, thereby driving the rotating unit to rotate.

13 Claims, 7 Drawing Sheets

BIAXIAL SCANNING MIRROR FOR IMAGE FORMING APPARATUS

FIELD OF THE INVENTION

The present invention relates to a biaxial scanning mirror for an image forming apparatus. More particularly, the present invention relates to a biaxial scanning mirror magnetically rotating with respect to two axes or magnetically rotating with respect to one axis and electrically rotating with respect to the other axis.

BACKGROUND OF THE INVENTION

Micro mirrors made by micro-electro-mechanical system (MEMS) process are widely used for light beam scanning devices, such as a scanning mirror in a mini projector. Conventionally, it is driven by electrostatic forces at high rotating speed.

Figure 1A:
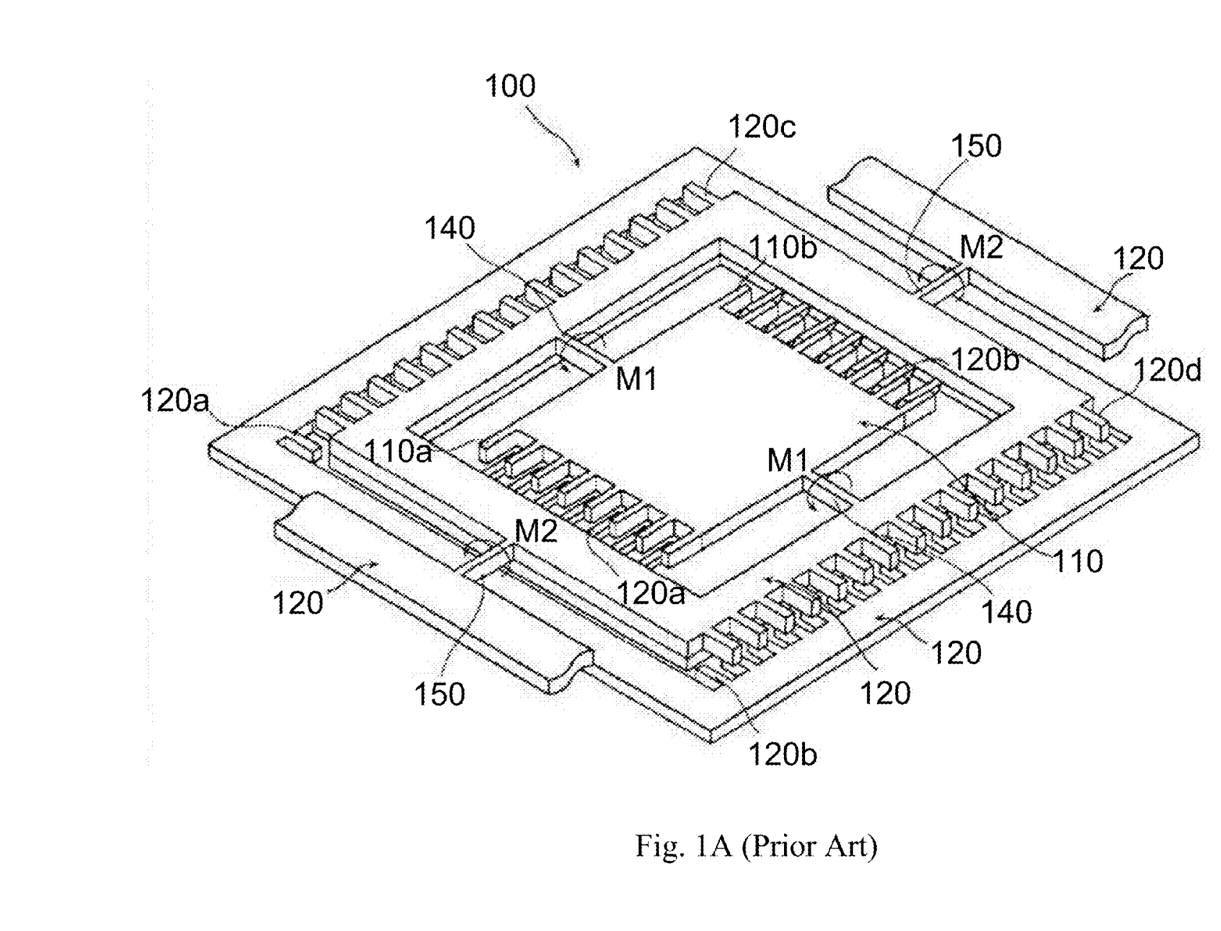
FIG. 1A shows a micro mirror of a prior art.

Please refer to FIG. 1A. U.S. Pat. No. 6,817,725 discloses a micro mirror unit 100 for incorporation in a device, such as an optical switch. The micro mirror unit 100 includes a mirror-formed portion 110 having an upper surface provided with a mirror surface (not illustrated), an inner frame 120 and an outer frame 120 (partly un-illustrated), each formed with comb-like electrodes integrally therewith. Specifically, the mirror-formed portion 110 has ends facing away from each other, and a pair of comb-like electrodes 110a and 110b are formed respectively on these ends. In the inner frame 120, a pair of comb-like electrodes 120a and 120b extend inwardly, corresponding to the comb-like electrodes 110a and 110b. Also, a pair of comb-like electrodes 120c and 120d extend outwardly. In the outer frame 120, a pair of comb-like electrodes 120a and 120b extend inwardly, corresponding to the comb-like electrodes 120c and 120d. The mirror-formed portion 110 and the inner frame 120 are connected with each other by a pair of torsion bars 140. The inner frame 120 and the outer frame 120 are connected with each other by a pair of torsion bars 150. The pair of torsion bars 140 provides a rotation axis for the mirror-formed portion 110 to rotate with respect to the inner frame 120. The pair of torsion bars 150 provides a rotation axis for the inner frame 120, as well as for the associating mirror-formed portion 110, to rotate with respect to the outer frame 120.

Figure 1B:
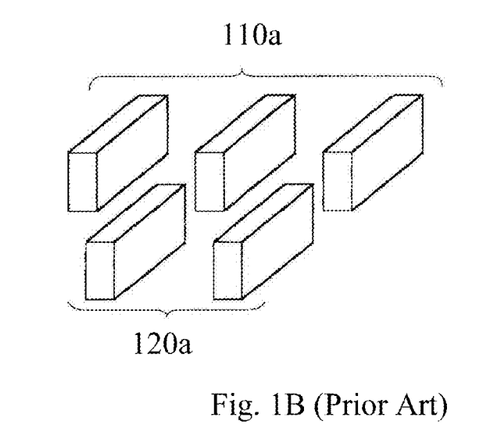
FIGS. 1B and 1C show mechanism of detailed structures of the prior art in FIG. 1A.
Figure 1C:
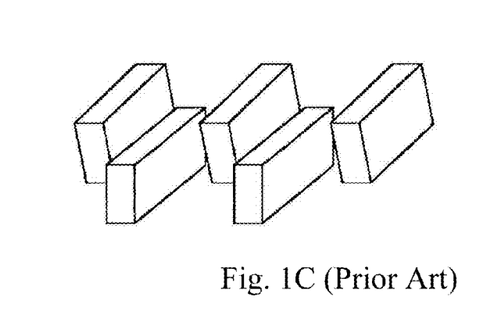

With the above arrangement, in the micro mirror unit 100, a pair of comb-like electrodes, such as the comb-like electrode 110a and the comb-like electrode 120a, are opposed closely to each other for generation of static electric force, and take positions as shown in FIG. 1B, i.e. one of the electrode assuming a lower position and the other assuming an upper position, when there is no voltage applied. When an electric voltage is applied, as shown in FIG. 1C, the comb-like electrode 110a is drawn toward the comb-like electrode 120a, thereby rotating the mirror-formed portion 110. More specifically, in FIG. 1A, when the comb-like electrode 110a is given a positive charge whereas the comb-like electrode 120a is given a negative charge, the mirror-formed portion 110 is rotated in a direction M1 while twisting the pair of torsion bars 140. On the other hand, when the comb-like electrode 120c is given a positive charge whereas the comb-like electrode 120a is given a negative charge, the inner frame 120 is rotated in a direction M2 while twisting the pair of torsion bars 150.

As a conventional method, the micro mirror unit 100 can be made from an SOI (Silicon on Insulator) wafer which sandwiches an insulating layer between silicon layers. However, according to the conventional method of manufacture as described above, the thickness of the wafer is directly dependent on the thickness of the micro mirror unit 100. Specifically, the thickness of the micro mirror unit 100 is identical with the thickness of the wafer which is used for the formation of the micro mirror unit. For this reason, according to the conventional method, the material wafer must have the same thickness as the thickness of the micro mirror unit 100 to be manufactured. This means that if the micro mirror unit 100 is to be thin, the wafer of the same thinness must be used. For example, take a case of manufacturing a micro mirror unit 100 having a mirror surface having a size of about 100 through 725 µm. In view of a mass of the entire moving part including the mirror-formed portion 110 and the inner frame 120, the amount of movement of the moving part, the size of the comb-like electrodes necessary for achieving the amount of movement, etc considered comprehensively, a desirable thickness of the moving part or the micro mirror unit 100 is determined. In this particular case, the desirable thickness is 100 through 200 µm. As a result, in order to manufacture the micro mirror unit 100 having such a thickness, a wafer having the thickness of 100 through 200 µm is used.

According to the conventional method, in order to manufacture a thin micro mirror unit 100, a correspondingly thin wafer must be used. This means that the greater diameter the wafer has, the more difficult to handle the wafer. For instance, take a case in which a micro mirror unit 100 is to be manufactured from an SOI wafer having a thickness of 200 µm and a diameter of 6 inches. Often, the wafer is broken in a midway of the manufacturing process. Further, the limitation on the size of the flat surface of the wafer places a limitation on the manufacture of micro mirror array chips. Specifically, when the micro mirror array chips are manufactured by forming a plurality of micro mirror units in an array pattern on a single substrate, the size of the array is limited.

Precise lateral alignment between two sets of comb-like electrodes, e.g., electrodes 120c and 120a, are inherently difficult to achieve since they are not coplanar and are fabricated in two different layers of the substrate. This can further result in non-linear and unstable behavior. Furthermore, driving force provided by the comb-like electrodes is limited and power needed by the electrodes to drive the mirror is large.

Figure 2A:
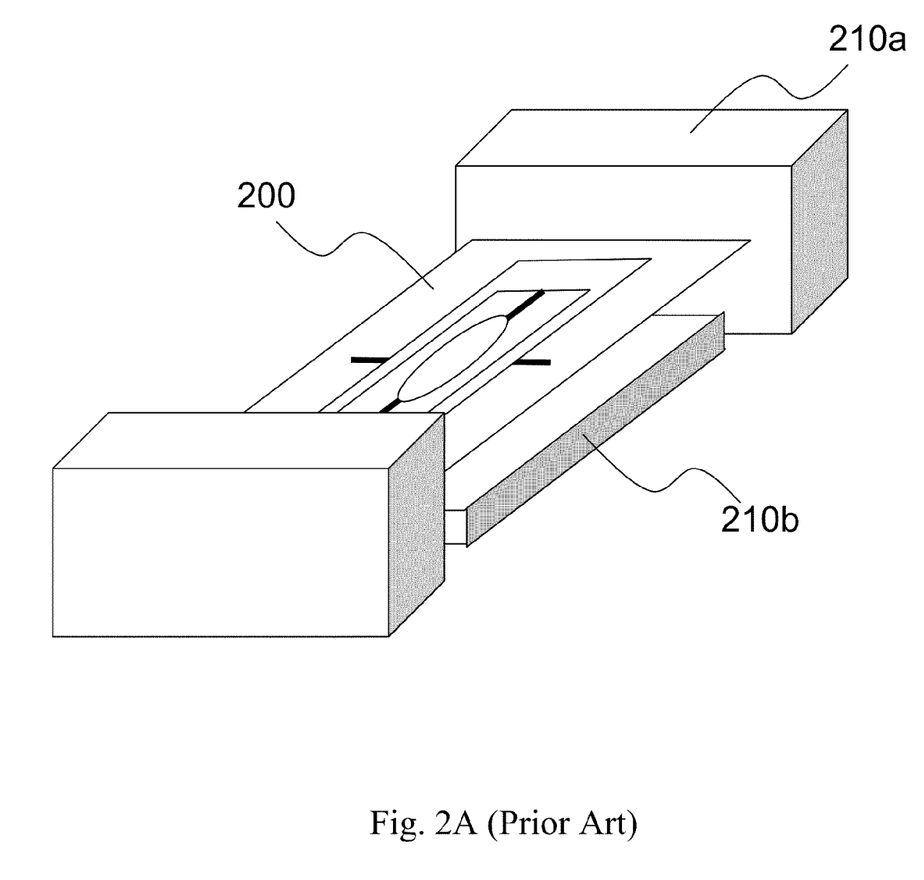
FIGS. 2A and 2B show biaxial scanning mirrors according to other prior arts.

Please refer to FIG. 2A. In order to overcome the aforementioned disadvantages, magnets 210 are used to replace the comb-like electrodes for providing driving force to rotate a biaxial mirror assembly 200. Two side magnets 210a with the same magnetization direction are positioned on both sides of the biaxial mirror assembly 200 above a bottom magnet 210b with an opposite magnetization direction. However, these two side magnets 210a occupy a large space, and thus, such a structure is too big. Furthermore, it is hard to increase the magnetic field without drastically increasing the magnet volume.

Figure 2B:
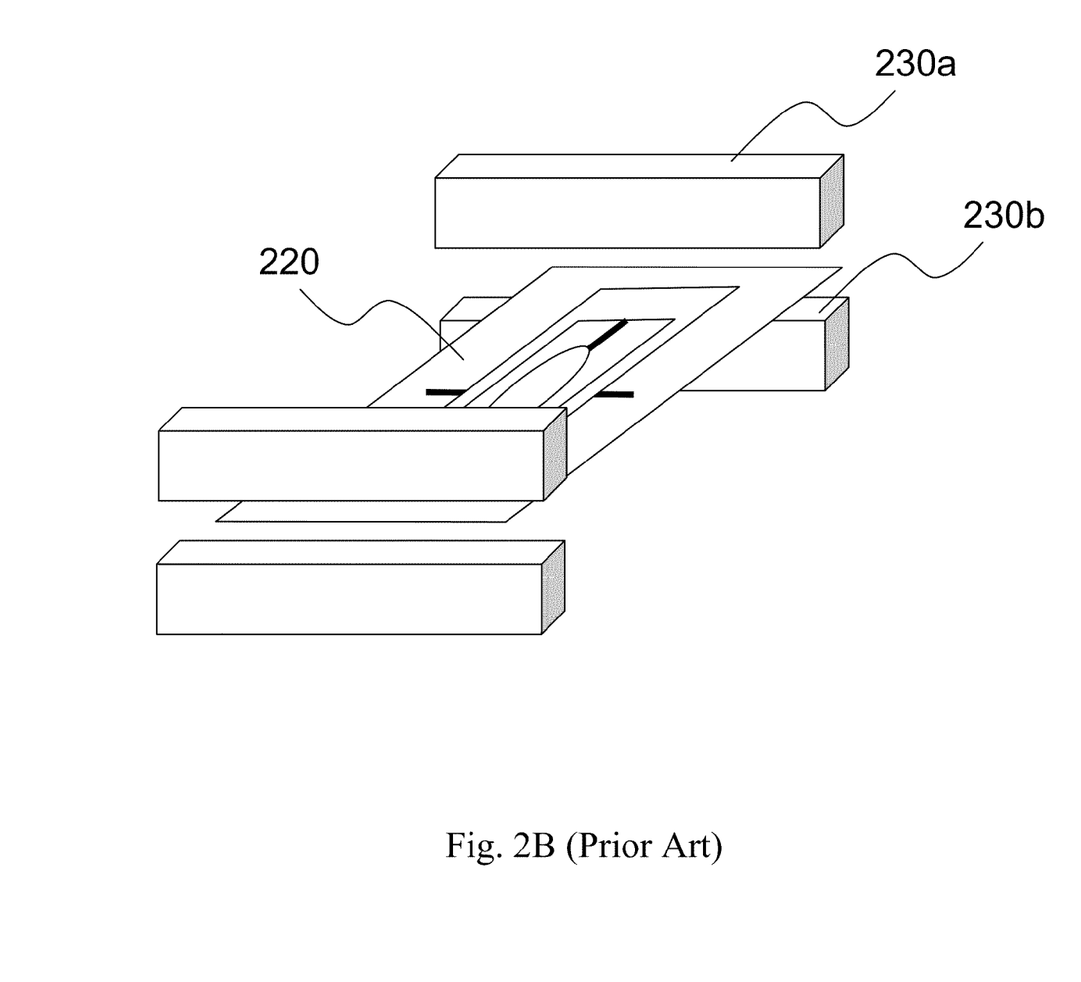

To minimize the total size another structure having two magnets 230a placed on top of a biaxial mirror assembly 220, and another two magnets 230b placed below the biaxial mirror assembly 220 is shown in FIG. 2B. However, the total size of such structure is still too large due to the fact that the magnets 230a and 230b need to allow enough space for the biaxial mirror assembly 220 to rotate.

Therefore, a biaxial mirror assembly having a small size with large driving force is desperately desired.

SUMMARY OF THE INVENTION

This paragraph extracts and compiles some features of the present invention; other features will be disclosed in the follow-up paragraphs. It is intended to cover various modifications and similar arrangements included within the spirit and scope of the appended claims.

In accordance with an aspect of the present invention, a biaxial scanning mirror for an image forming apparatus, includes a first wafer, including: a mirror unit, rotating with respect to a first axis, for reflecting light beams; a rectangular rotating unit, formed around the mirror unit, for rotating the mirror unit around a second axis which is perpendicular to the first axis, wherein the rotating unit has two vertical sides perpendicular to the second axis and two parallel sides parallel to the second axis; a permanent magnet fixed at center of each of the two vertical sides; and a magnetically permeable layer formed below each of the two vertical sides of the rotating unit for extending magnetic field generated by the permanent magnet from the center of the rotating unit to both ends of the vertical sides; a second wafer having at least two cores, placed below both ends of the vertical sides of the rotating unit, each surrounded by a planar coil applied with an AC current for switching magnetic polarization of the cores such that the cores are attracted to or repelled from the rotating unit alternatively, thereby driving the rotating unit to rotate with respect to the second axis; and a spacer, formed between the second wafer and the first wafer, for separating the second wafer and the first wafer.

Preferably, the magnetically permeable layer includes iron (Fe), nickel (Ni), zinc (Zn), manganese (Mn), or magnesium (Mg).

Preferably, the biaxial scanning mirror further includes a comb drive actuator for driving the mirror unit.

Preferably, the mirror unit is actuated by rotation of the rotating unit around the second axis.

Preferably, resonant frequency of the mirror unit around the first axis is higher than that of the rotating unit around the second axis.

Preferably, the cores are perpendicular to the first wafer and the second wafer.

Preferably, the planar coils are formed by Micro-Electro-Mechanical Systems (MEMS) process.

Preferably, the biaxial scanning mirror further includes a stopper formed on the second wafer for preventing the permanent magnet from impacting the second wafer.

Preferably, the rotating unit is applied with a signal having a waveform of saw-tooth with a frequency of 60 Hz.

Preferably, the mirror unit is applied with a sinusoidal signal with a frequency larger than 18 KHz.

Preferably, the mirror unit is electrostatically triggered and the rotating unit is magnetically triggered.

Preferably, the mirror unit and the rotating unit are both magnetically triggered.

DETAILED DESCRIPTION OF THE PREFERRED EMBODIMENT

The present invention will now be described more specifically with reference to the following embodiment. It is to be noted that the following descriptions of preferred embodiment of this invention are presented herein for purpose of illumination and description only; it is not intended to be exhaustive or to be limited to the precise form disclosed.

Figure 3:
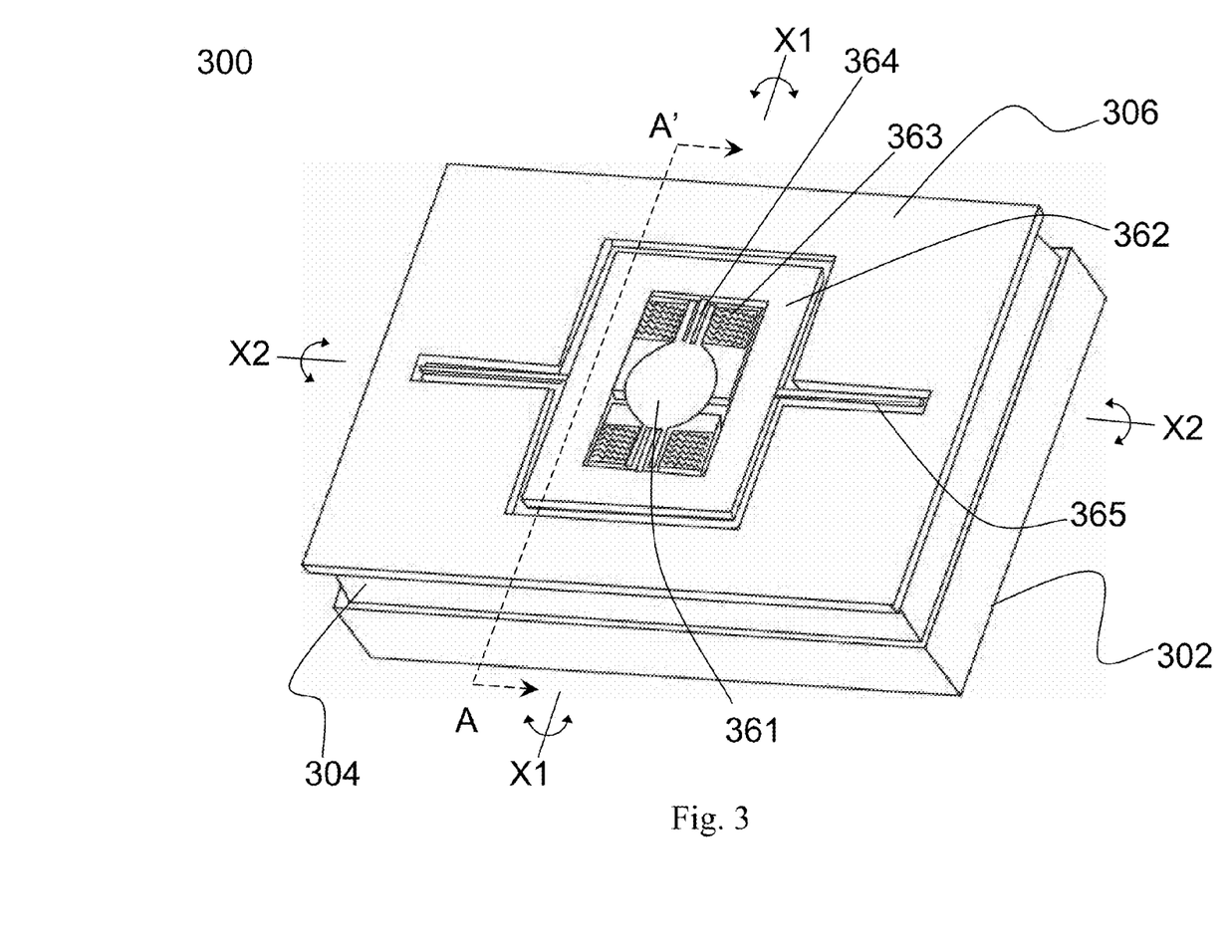
FIG. 3 illustrates a biaxial scanning mirror according to the present invention.
Figure 4:
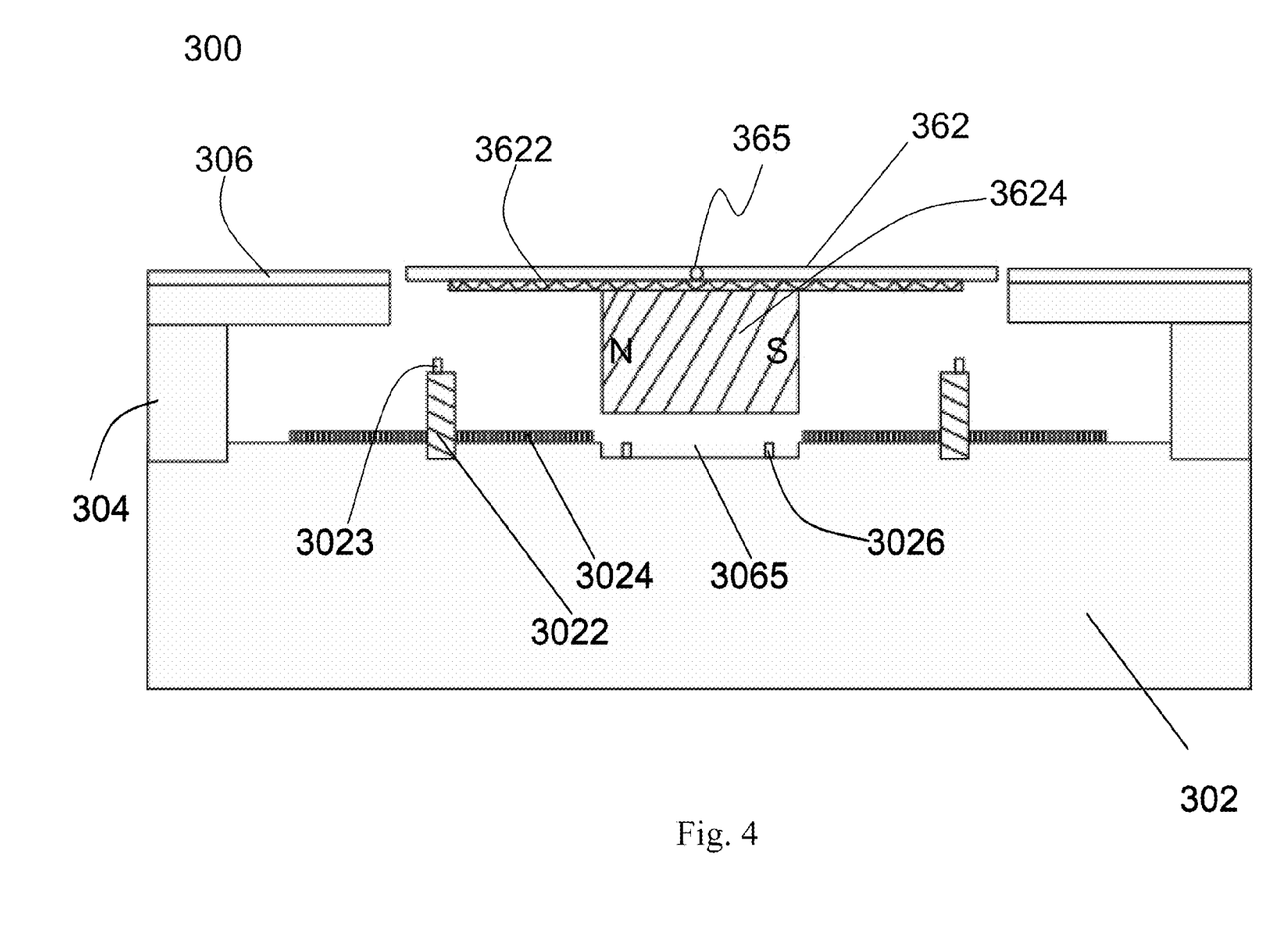
FIG. 4 shows a cross-sectional view of the biaxial scanning mirror along line AA' in FIG. 3.
Figure 5:
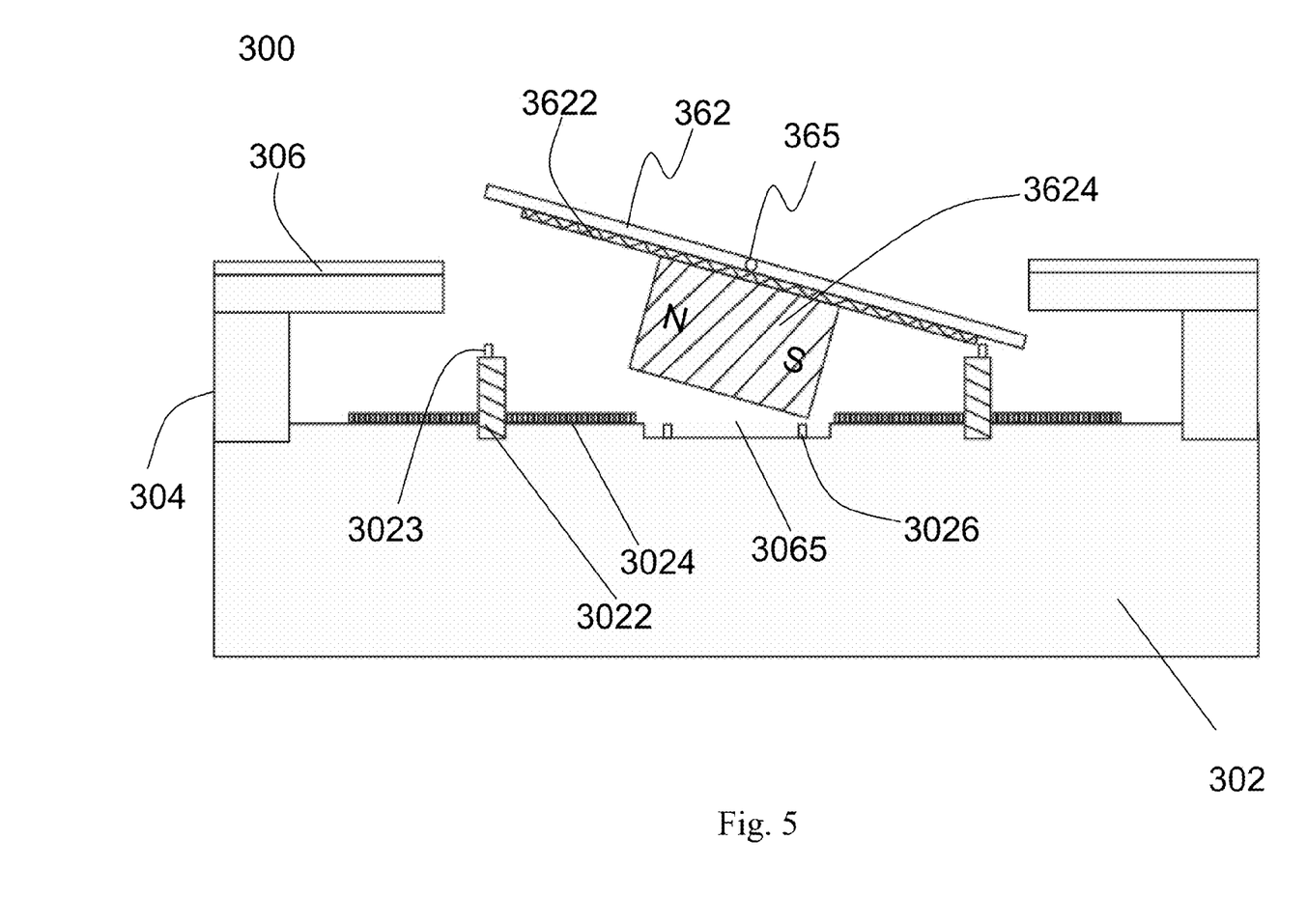
FIG. 5 illustrates how a rotating unit rotates with respect to an axis.

Please refer to FIG. 3 to FIG. 5. An embodiment is described. A biaxial scanning mirror 300 has a second wafer 302, a spacer 304 and a first wafer 306. The second wafer 302 and the first wafer 306 are both silicon wafers and formed by Micro-Electro-Mechanical Systems (MEMS) process. The first wafer 306 has a mirror unit 361, rotating with respect to a first axis X1, for reflecting light beams. Here, a first shaft 364 is formed along the first axis X1 so that rotation of the mirror unit 361 is fulfilled. In the present invention, it is driven by a comb drive actuator 363. The first wafer 306 also has a rotating unit 362, formed around the mirror unit 361, for rotating the mirror unit 361 with respect to a second axis X2 which is perpendicular to the first axis X1. In the same way, a second shaft 365 is connected to the rotating unit 362 along the second axis X2 and rotation of the mirror unit 361 with respect to the second axis X2 is achieved.

The comb drive actuator 363 can be replaced by other driving devices. For example, the mirror unit 361 rotates around the first shaft 364 by resonance with the rotation of the rotating unit 362 around the second shaft 365. It means the mirror unit 361 is actuated by rotation of the rotating unit 362 around the second shaft 365.

In order to have detailed description for each component, a cross-sectional view is cut along line AA' shown in FIG. 4. It is obvious that the spacer 304 is formed between the second wafer 302 and the first wafer 306 for separating the second wafer 302 and the first wafer 306. Meanwhile, distance between the second wafer 302 and the first wafer 306 can be fixed as well.

FIG. 4 illustrates the internal structure of the biaxial scanning mirror 300 of the present invention. The first wafer 306 has a magnetically permeable layer 3622 formed below the rotating unit 362. The magnetically permeable layer 3622 is made of iron (Fe), nickel (Ni), zinc (Zn), manganese (Mn), magnesium (Mg) or a mixture of these elements mentioned above. In the present embodiment, the material is mixture of Fe and Ni (referred to as Fe/Ni hereafter). The magnetically permeable layer 3622 is formed by coating the Fe/Ni on a portion of the backside of the rotating unit 362 to which the second shaft 365 is connected.

The first wafer 306 has a permanent magnet 3624 fixed below the magnetically permeable layer 3622. The permanent magnet 3624 is assembled at the center of the magnetically permeable layer 3622. It can prevent the rotating unit 362 from excessive increase of moment of inertia out of the permanent magnet 3624. The permanent magnet 3624 can provide a magnetic field to the magnetically permeable layer 3622 that extends the magnetic field in the lateral direction to both ends thereof, as shown in FIG. 4.

The second wafer 302 has two cores 3022 each surrounded by a planar coil 3024. The cores 3022 are perpendicular to the second axis X2 (second shaft 365). The planar coils 3024 are positioned on opposite sides of the permanent magnet 3624. The more number of turns the coils 3024 have, the stronger the magnetic field generated by the coils 3024 can be. In this embodiment, the number of turns of the coils 3024 is 24 in a single layer. The number can be 48 in two layers. The core 3022 can be precisely assembled into a cavity (not shown) on the second wafer 302. The cavities can be formed by deposition, photolithography, or etching.

The two magnetic poles (N and S) of the permanent magnet 3624 face the two cores 3022, respectively. Air gaps are formed between the permanent magnet 3624 and the cores 3022. An AC current is applied to the planar coils 3024 for switching magnetic polarization of the cores 3022. By this way, the cores 3022 are attracted to or repelled from the rotating unit 362 alternatively for driving the rotating unit 362 to rotate with respect to the second axis X2. The planar coils 3024 are formed by Micro-Electro-Mechanical Systems (MEMS) process.

Two lower stoppers 3026 are formed in each of two recesses 3065 (only one is shown in FIGS. 4 and 5) on the second wafer 302 for preventing the permanent magnet 3624 from impacting the second wafer 302 to protect the biaxial scanning mirror 300 from impact damage. Similarly, two upper stoppers 3023 are formed on the cores 3022. The effect of the upper stoppers 3023 is to prevent the permanent magnet 3624 from impacting the cores 3022. As shown in FIG. 5, the lower stoppers 3026 and the upper stoppers 3023 function when the rotating unit 362 operates.

Usually, frequency of the mirror unit 361 around the first shaft 364 is higher than that of the rotating unit 362 around the second shaft 365. In practice, the number of the cores 3022 is not limited to two. More than two cores at one side of the rotating unit 362 can be used to rotate the rotating unit 362.

In the present invention, a saw-tooth signal with a frequency of 60 Hz is applied to the rotating unit 362 for triggering the rotating unit 362 to rotate around the second axis X2, thereby allowing the mirror unit 361 to rotate around the second axis X2. A sinusoidal signal with a frequency larger than 18 KHz is applied to the mirror unit 361 via the comb drive actuator 363 for triggering the mirror unit 361 to rotate around the first axis X1. Alternatively, a sinusoidal signal with a frequency larger than 18 KHz can also be provided to the mirror unit 361 via the planar coil 3024 while a comb drive actuator is not used.

While the invention has been described in terms of what is presently considered to be the most practical and preferred embodiment, it is to be understood that the invention needs not be limited to the disclosed embodiment. On the contrary, it is intended to cover various modifications and similar arrangements included within the spirit and scope of the appended claims, which are to be accorded with the broadest interpretation so as to encompass all such modifications and similar structures.

What is claimed is:

1. A biaxial scanning mirror for an image forming apparatus, comprising:
   a first wafer, comprising:
      a mirror unit, rotating with respect to a first axis, for reflecting light beams;
      a rectangular rotating unit, formed around the mirror unit and connected to the mirror unit by a first shaft along the first axis, for rotating the mirror unit around a second axis which is perpendicular to the first axis, wherein the rotating unit includes first and second elongated planar sections extending perpendicular to the second axis and third and fourth elongated planar sections extending parallel to the second axis, the first through fourth elongated planar sections surrounding the mirror unit;
      a permanent magnet fixedly attached to each of the first and second elongated planar sections near a center thereof; and
      a magnetically permeable layer formed on each of the first and second elongated planar sections of the rotating unit for extending magnetic field generated by the permanent magnet from the center of the first and second elongated planer sections to both ends thereof;
   a second wafer having a plurality of cores, including at least two cores placed below two ends of the first elongated planar section of the rotating unit and at least two cores placed below two ends of the second elongated planar section of the rotating unit, each core being surrounded by a planar coil for receiving an AC current for switching magnetic polarization of the core, such that the cores are attracted to or repelled from the rotating unit alternatively, thereby driving the rotating unit to rotate with respect to the second axis; and
   a spacer, formed between the second wafer and the first wafer, for separating the second wafer and the first wafer.

2. The biaxial scanning mirror according to claim 1, wherein the magnetically permeable layer comprises iron (Fe), nickel (Ni), zinc (Zn), manganese (Mn), or magnesium (Mg).

3. The biaxial scanning mirror according to claim 1, further comprising a comb drive actuator for driving the mirror unit.

4. The biaxial scanning mirror according to claim 1, wherein the mirror unit is actuated by rotation of the rotating unit around the second axis.

5. The biaxial scanning mirror according to claim 1, wherein resonant frequency of the mirror unit around the first axis is higher than that of the rotating unit around the second axis.

6. The biaxial scanning mirror according to claim 1, wherein the cores are perpendicular to the first wafer and the second wafer.

7. The biaxial scanning mirror according to claim 1, wherein the planar coils are formed by Micro-Electro-Mechanical Systems (MEMS) process.

8. The biaxial scanning mirror according to claim 1, further comprising a stopper formed on the second wafer for preventing the permanent magnet from impacting the second wafer.

9. The biaxial scanning mirror according to claim 1, wherein the rotating unit is applied with a signal having a waveform of saw-tooth with a frequency of 60 Hz.

10. The biaxial scanning mirror according to claim 1, wherein the mirror unit is applied with a sinusoidal signal with a frequency larger than 18 KHz.

11. The biaxial scanning mirror according to claim 1, wherein the mirror unit is electrostatically triggered and the rotating unit is magnetically triggered.

12. The biaxial scanning mirror according to claim 1, wherein the mirror unit and the rotating unit are both magnetically triggered.

13. The biaxial scanning mirror according to claim 1, wherein each permanent magnet has two magnetic poles respectively facing the two cores placed below the two ends of the corresponding first or second elongated planar sections.

* * * * *